United States Patent [19]

Mishina et al.

[11] Patent Number: 5,156,325

[45] Date of Patent: Oct. 20, 1992

[54] VAPOR REFLOW TYPE SOLDERING METHOD AND APPARATUS THEREFOR

[75] Inventors: Haruo Mishina, Ushiku; Shinya Yamama, Abiko, both of Japan

[73] Assignee: Hitachi Techno Engineering Co., Ltd., Tokyo, Japan

[21] Appl. No.: 630,811

[22] Filed: Dec. 20, 1990

[30] Foreign Application Priority Data

Dec. 25, 1989 [JP] Japan .................. 1-332920

[51] Int. Cl.⁵ ............................................. B23K 1/015
[52] U.S. Cl. ..................................... 228/219; 228/42; 228/242
[58] Field of Search ................ 228/242, 240, 219, 42, 228/180.1

[56] References Cited

FOREIGN PATENT DOCUMENTS

| | | | |
|---|---|---|---|
| 6390361 | 4/1988 | Japan | 228/242 |
| 0119976 | 5/1988 | Japan | 228/242 |
| 0044273 | 2/1989 | Japan | 228/242 |
| 0245963 | 10/1989 | Japan | 228/242 |
| 0278962 | 11/1989 | Japan | 228/242 |

*Primary Examiner*—Richard K. Seidel
*Assistant Examiner*—James Miner
*Attorney, Agent, or Firm*—Antonelli, Terry, Stout & Kraus

[57] ABSTRACT

In case of suspending an apparatus upon the completion of soldering operation, from not smaller than 50% to less than 95% of a thermomedium in a reflow section is transferred to a filtering tank and the remaining thermomedium is made to pass through a water separator in advance of suspending the apparatus, so that water in the thermomedium is removed. This water removing operation makes it possible to prevent the corrosion of the reflow section and the deterioration of the thermomedium. Additionally, a method is disclosed for preventing water to be mixed with the thermomedium by warming the reflow section before operation.

12 Claims, 4 Drawing Sheets

VAPOR REFLOW TYPE SOLDERING METHOD AND APPARATUS THEREFOR

BACKGROUND OF THE INVENTION

1. Field of the Invention

The present invention relates to a vapor reflow type soldering method and an apparatus therefor by which soldering is effected by bringing a matter to be treated, which is prepared by mounting electronic components and the like on a circuit substrate applied with a solder, into contact with a saturated vapor of a thermomedium, and more particularly, to a vapor reflow type soldering method and a vapor reflow type soldering apparatus improved to be able to prevent water contained in the air from being mixed in the thermomedium.

2. Description of the Prior Art

In vapor reflow type soldering apparatus, soldering is effected in such a manner, as disclosed in Japanese Patent Unexamined Publication No. 60-106502, that a treated matter prepared by mounting electronic components and the like on a circuit substrate applied with a solder is carried into a saturated vapor of a thermomedium of a large specific gravity to air so as to be brought into contact with the saturated vapor so that the treated matter is heated by the latent heat of condensation of the saturated vapor to ensure the soldering. However, since a flux is generated at the time of soldering and mixed in the thermomedium, a filtering section is equipped for the purpose of removing the flux mixed in the thermomedium as disclosed in Japanese Patent Unexamined Publication Nos. 62-148086 and 63-90361.

In the above well-known vapor reflow type soldering apparatus, as a day's operation is finished, heating by a heater is stopped and, at the same time, the thermomedium is cooled by cooling coils to become liquid which is returned to a vapor tank and collected in the bottom portion thereof. As the thermomedium is condensed, air enters through a carrier inlet and a carrier outlet so that it is cooled by the cooling coils like the thermomedium, resulting in that water produced due to condensation of steam in the air is allowed to flow into the vapor tank together with the thermomedium. Further, since the thermomedium collected in the vapor tank is transferred to a filtering section, the interior of the vapor tank is filled up with the air. Thereafter, the thermomedium from which foreign matter is removed due to cooling in the filtering section is returned to the vapor tank to be made to come in contact with water in the air or water condensed on the inner wall of the vapor tank, resulting in the mixing with part of water.

The thermomedium transferred from the vapor tank to the filtering section is cooled by a cooling coil of the filtering tank. In this case, steam in the air entered into the upper portion of the filtering tank is condensed to be mixed into the thermomedium. Further, in case of transferring the thermomedium to the filtering tank, if there has already been generated condensate water in the cooling coil, this water is made to be mixed together into the thermomedium as well.

Since a fluoric inert liquid is used as the thermomedium, when the thermomedium is heated by the heater at the time of resuming the operation on the next day, the condensate water mixed in or being in contact with the thermomedium is first boiled to react with the thermomedium to generate hydrofluoric acid, resulting in some cases in the corrosion of the reflow section or the deterioration of the thermomedium. Further, in case that water is contained in the thermomedium, as the thermomedium is heated the water is boiled to absorb latent heat. As a result, not only the heating condition of the thermomedium becomes unstable but also extra energy is required.

SUMMARY OF THE INVENTION

An object of the present invention resides in that during the time interval from the completion of operation to the resumption of the next operation, when a thermomedium is accumulated in a vapor tank or subjected to filtering, water in the air or water attributable to condensed steam is prevented from being mixed in the thermomedium to prevent the generation of hydrogen fluoride or hydrofluoric acid, thereby preventing the occurrence of corrosion of a reflow section as well as preventing the deterioration of the thermomedium while stabilizing the heating of the thermomedium to save energy.

The fundamental principle of a method of the present invention is that, in view of the fact that a large quantity of water mixed due to condensation of steam in the air is contained in an upper layer part of a thermomedium within a vapor tank depending upon the specific gravity at the time of the completion of operation, a lower layer part of the thermomedium which contains no water is first transferred to a filtering tank and the remaining part of the thermomedium is then transferred to the filtering tank through a water separator.

Subsequently, the thermomedium is maintained at a temperature at which water is not allowed to remain (for example, 40° to 60° C. for a long period of time and 100° C. for a short period of time). The maintenance temperature is set to be not higher than the boiling point of the thermomedium.

Furthermore, an apparatus for carrying out the above method according to the present invention is equipped with switchable valve means in a pipeline through which a thermomedium is transferred from a vapor tank to a filtering section and in a pipeline through which the thermomedium is transferred from the vapor tank to a recovery section, thereby making it possible to transfer a fixed quantity of thermomedium from the vapor tank to the filtering section as well as to transfer the thermomedium from the vapor tank to the recovery section.

Function of the soldering apparatus of the above arrangement will be described briefly as follows.

Water has a specific gravity smaller than that of the thermomedium. For this reason, the water mixed in the thermomedium in the vapor tank is distributed only in the vicinity of the superficial layer thereof.

In consequence, it is possible to store in the filtering tank the thermomedium which contains no water, provided that, after part of the thermomedium existing in the bottom portion of the vapor tank is transferred to the filtering tank, the remaining part of the thermomedium is transferred to the filtering tank through a water separator.

By maintaining the thermomedium existing in the filtering tank at a temperature with-in the aforementioned range (that is, at a temperature which is not higher than the boiling point and at which water is not allowed to remain in the thermomedium), steam is prevented from being condensed and mixed in the thermomedium while the vapor reflow type solving apparatus concerned is out of operation.

DESCRIPTION OF THE PREFERRED EMBODIMENTS

Figure 1:
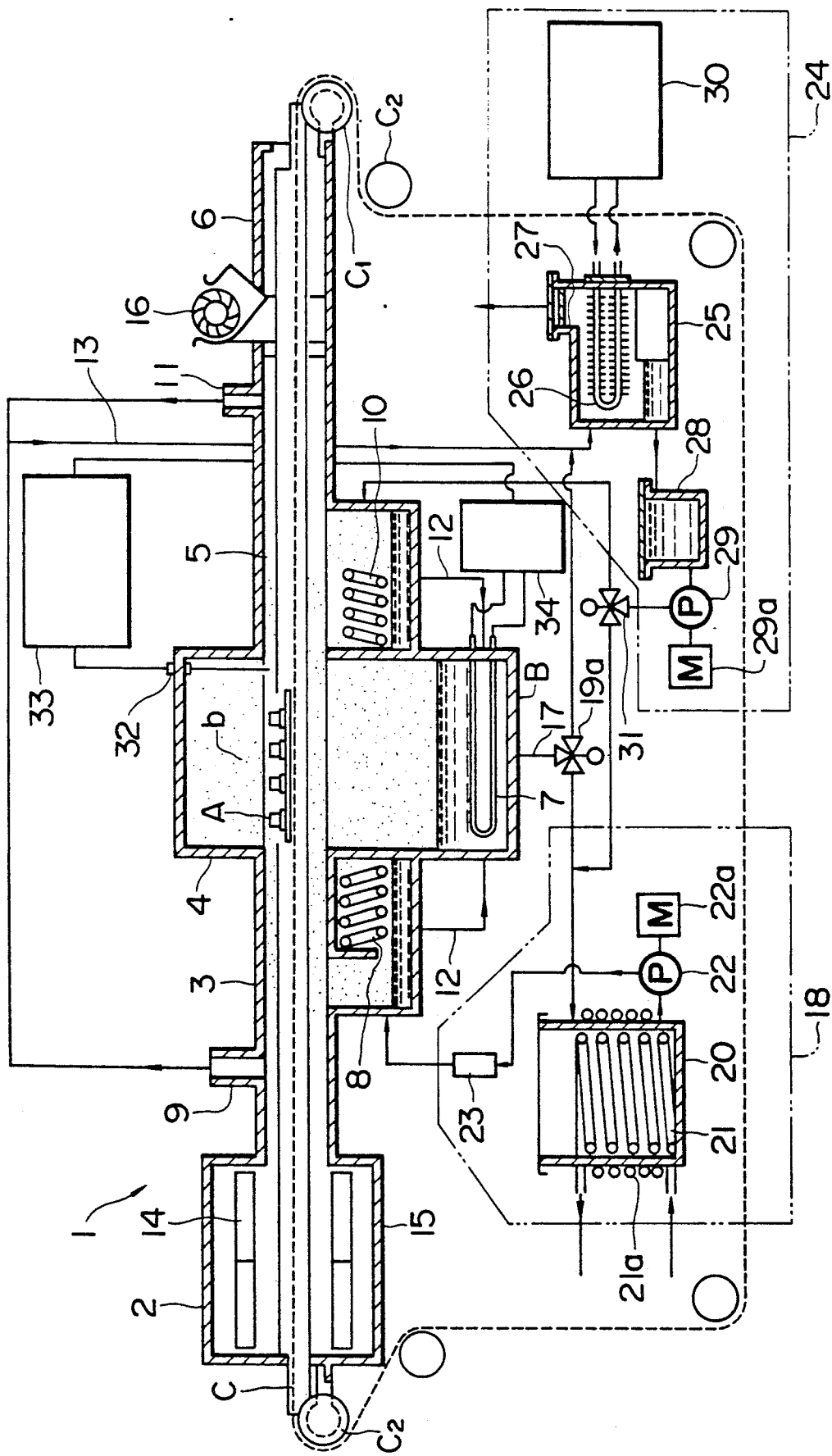
FIG. 1 is a schematic system view of a vapor reflow type soldering apparatus according to a first embodiment of the present invention.

A first embodiment of the present invention will be described with reference to FIG. 1. In a reflow section 1, a preheating chamber 2, a carry-in passage 3, a vapor tank 4, a carry-out passage 5 and a cooling chamber 6 are disposed in series, and a heater 7 is provided in the bottom portion of the vapor tank 4. The carry-in passage 3 and the carry-out passage 5 are provided with cooling coils 8 and 10, respectively, for cooling a saturated vapor b of a thermomedium B drifting out of the vapor tank 4. The thermomedium B condensed back to a liquid by these cooling coils is returned to the vapor tank 4 through cooling coil pipelines 12. A carry-in passage outlet 9 and a carry-out passage outlet 11 are formed respectively in the carry-in passage 3 and the carry-out passage 5 at positions thereof where the saturated vapor b comes in contact with the air, so that the air entered into the reflow section 1 and the saturated vapor b made into contact with the air are permitted to be discharged from the carry-in passage outlet 9 and the carry-out passage outlet 11 through a discharge pipeline 13.

A treated matter A prepared by mounting electronic components and the like on a circuit substrate applied with a solder is carried into the preheating chamber 2 by means of a carrying conveyor C and conveyed to the carry-in passage 3 while being subjected to the preheating due to upper and lower heaters 14 and 15. In the carry-in passage 3, the treated matter A comes in contact with the saturated vapor b drifting out of the vapor tank 4 so that it is further preheated to an elevated temperature, and then enters into the vapor tank 4 while causing the air around the treated matter A to be substituted by the saturated vapor b of a large specific gravity to air. After the solder is melted in the vapor tank 4 due to heating, the treated matter A is conveyed to the carry-out passage 5 where the solder is solidified and further to a cooling chamber 6 so as to be cooled forcibly by a cooling fan 16, and thereafter, the treated matter A is carried out.

The thermomedium B in the bottom portion of the vapor tank 4 is heated by a heater 7 to become the saturated vapor b which not only fills up the interior space of the vapor tank 4 but also drifts out to the carry-in passage 3 and the carry-out passage 5. The saturated vapor b drifting out to the carry-in passage 3, after serving to not only preheat the treated matter A but also prevent the invasion of the air, is condensed by the cooing coil 8 so as to be returned to the vapor tank 4. On the other hand, the saturated vapor b drifting out to the carry-out passage 5 is cooled to be condensed by the cooling coil 10 at it serves to prevent the invasion of the air, then, returned to the vapor tank 4. When the solder is melted in the vapor tank 4, a flux is evaporated and mixed in the saturated vapor b, so that the thermomedium B in the vapor tank 4 contains the flux. Filtering of the flux is carried out upon the completion of a day's operation in such a manner that, after the saturated vapor b is cooled to be condensed by the cooling coils 8 and 10 and collected in the vapor tank 4, the thermomedium B is made to pass through a pipeline 17 and a three-way valve 19a so as to be transferred to a filtering tank 20 in a filtering section 18 where it is cooled.

When the saturated vapor b is cooled to be condensed by the cooling coils 8 and 10, the air enters unavoidably and hence it is cooled as well by the cooling coils 8 and 10. As a result, water or steam contained in the air is also condensed to be made to flow into the vapor tank 4 where it is gathered in the upper part of the thermomedium B because of the difference in the specific weight. In order to prevent this phenomenon, after a fixed quantity of (from not smaller than 50% to less than 95% from the bottom of) the thermomedium B in the vapor tank 4 is transferred to the filtering tank 20, the three-way valve 19a is switched to be communicated with a recovery section 24 so as to permit the (remaining part of the) thermomedium B containing a large quantity of condensed water to be transferred to the filtering tank 20 through a water separator 28. In this way, it is possible to prevent the water from being mixed in the thermomedium B transferred to the filtering tank 20. In the filtering section 18, the thermomedium B collected in the filtering tank 20 is cooled by a cooling coil 21 for separating the flux and then returned to the reflow section 1 by the action of a pump 22 via a filter 23. In the prior art, since it is customary that the thermomedium is returned to the vapor tank 4 after being subjected to the filtering upon the completion of the operation, water contained in the air which has already entered in the vapor tank 4 or water contained in the air entered during the cooling of the thermomedium B returned to the vapor tank 4 is condensed on the inner surface of the vapor tank 4, resulting in a possibility that water is mixed in the thermomedium B before the operation is resumed on the next day. To the contrary, according to the present invention, the thermomedium B is stored in the filtering tank 20 before the operation is resumed on the next day while being kept warm by a heat retailing heater 21a at a temperature within the range from not lower than 100° C. to less than the boiling point. It is therefore possible to prevent the water from being mixed in the thermomedium due to condensation of water or steam contained in the air.

Furthermore, at the time of resuming the next day's operation, before the thermomedium B is returned to the vapor tank 4, the water condensed within the reflow section 1 is removed by raising the temperature in the reflow section 1 using the heater 7 to a temperature at which the water is not allowed to remain in the thermomedium and which is lower than the boiling point of the thermomedium B. It is therefore possible to prevent the water from being mixed in the thermomedium B.

In the recovery section 24, when the apparatus is in operation, a mixture gas of the air, the vapor b of the thermomedium B and the water is introduced through the discharge pipeline 13 into a recovery tank 25 in which it is cooled by a cooling pipe 26. Then, the air is exhausted through a demister 27 and the thermomedium B and the water thus cooled are separated from each other by the water separator 28 utilizing the difference in the specific gravity so that the thermomedium B alone is returned to the reflow section 1 through a recovery section three-way valve 31 by the action of a recovery pump 29. After once finishing the operation, the thermomedium B recovered to the recovery section 24 through the three-way valve 19a and containing the water may be returned to the reflow section 1 after being separated from the water in the same manner as described above. However, in this embodiment, the thermomedium B is transferred directly to the filtering tank 20 by switching over the recovery section three-way valve 31, thereby preventing the mixing of the water. Cold water is supplied from a chiller 30 so as to be made to pass through the cooling pipe 26 in the recovery tank 25, thereby improving the efficiency. When it is intended to carry out the filtering of the thermomedium B during the operation, it is sufficient that the thermomedium B of a high temperature is transferred through the three-way valve 19a to the filtering tank 20 where it is cooled down to a fixed temperature by the cooling coil 21 so as to separate the flux, and then, returned to the reflow section 1 through the filter 23. It is therefore unnecessary to keep warm or store in the filtering tank 20. Further, during the operation, the heater 7 is controlled by a power controller 34 so that the saturated vapor b is maintained at the fixed temperature by a thermometer 32 provided at the top of the vapor tank 4 and a thermoregulator 33.

The conveyor C serving to carry the treated matter A is extended along a driving sprocket C1 and a plurality of idlers C2.

The pump 22 of the filtering section 18 is driven by a motor 22a, and the recovery pump 29 of the recovery section 24 is driven by a motor 29a.

As described above, according to the present embodiment, there is no possibility that water in the air is mixed in the thermomedium.

Accordingly, there is no possibility that noxious hydrogen fluoride is generated even if the thermomedium B is heated at the time of resuming the operation.

Figure 2:
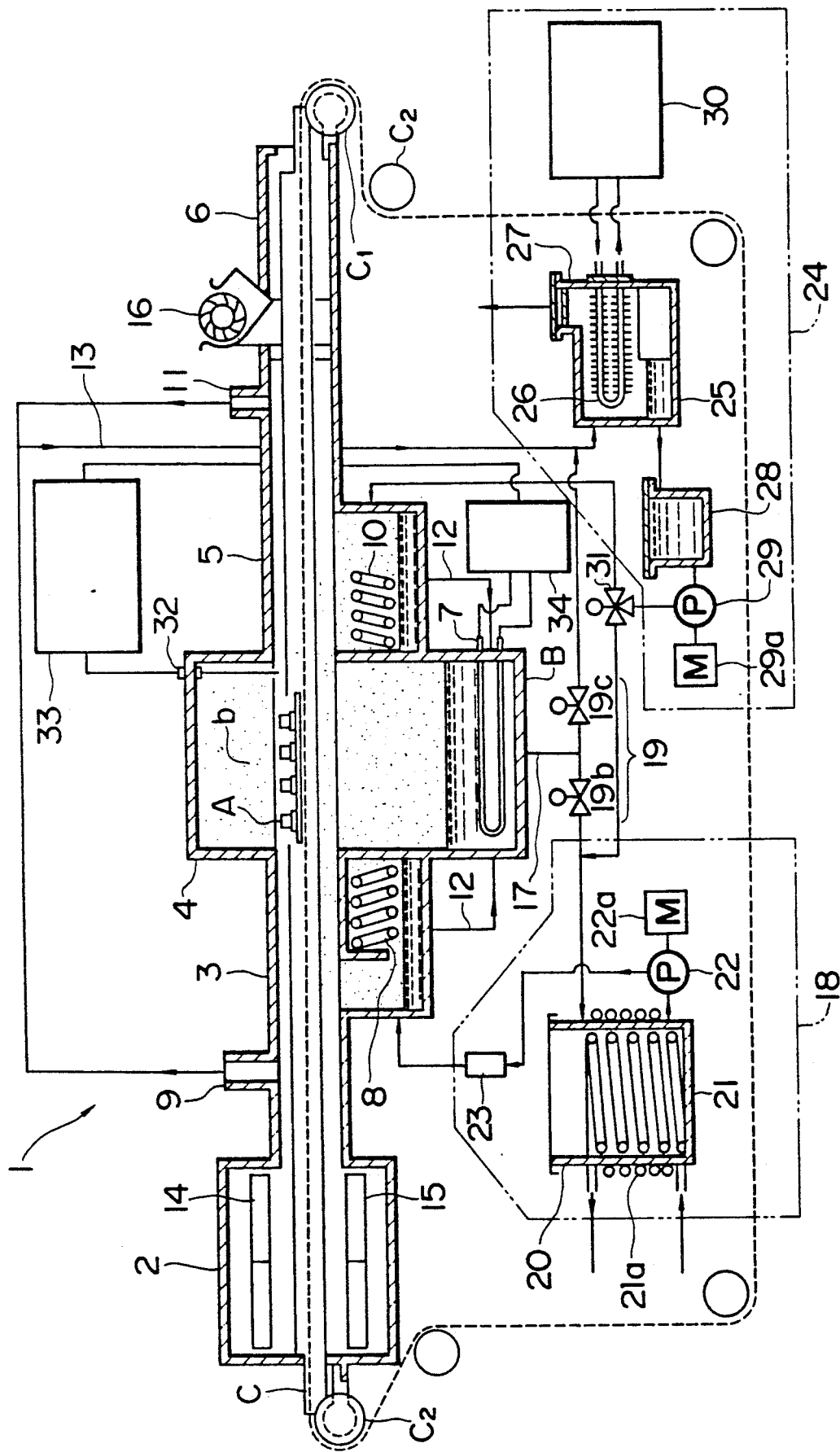
FIGS. 2, 3 and 4 are schematic system views of vapor reflow type soldering apparatus according to second, third and fourth embodiments of the present invention, respectively.

Next, a second embodiment will be described with reference to FIG. 2. The discharge pipeline 17 through which the thermomedium B is discharged from the bottom of the vapor tank 4 is provided with a valve means 19 consisting of two gate valves 19b and 19c. After a fixed quantity of thermomedium B is transferred to the filtering tank 20 through the gate valve 19b, the gate valve 10b is closed and, at the same time, the gate valve 19c is opened so as to cause the residual thermomedium B containing water to be transferred from the vapor tank 4 to the recovery section 24 for removing water. Then, the thermomedium B is transferred directly to the filtering tank 20 through the recovery section three-way valve 31 by the action of the recovery pump 29.

According to this embodiment, the same effects as those of the first embodiment (shown in FIG. 1) can be obtained without using the three-way valve.

Figure 3:
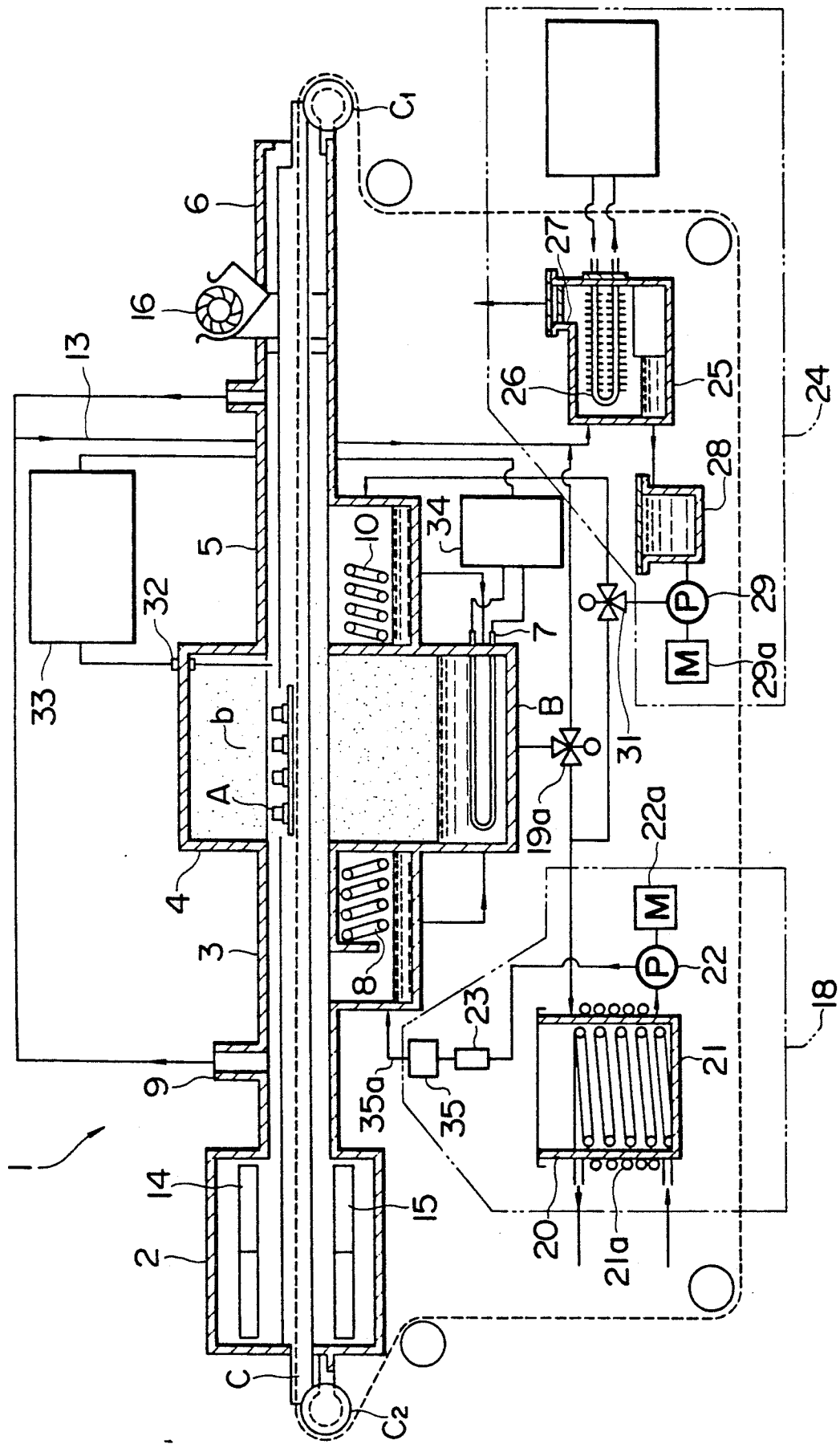

Next, a third embodiment will be described with reference to FIG. 3. A water separator 35 is provided in a return pipeline 35a so that, when the thermomedium B is returned from the filtering tank 20 to the reflow section 1, it is possible not only to remove the flux by means of the filter 23 but also to prevent water from being mixed in the thermomedium B even when heat retaining in the filtering tank 20 is insufficient. Furthermore, even when the water is not removed in the recovery section 24, the thermomedium B can be returned to the reflow section 1 with the water removed therefrom.

Figure 4:
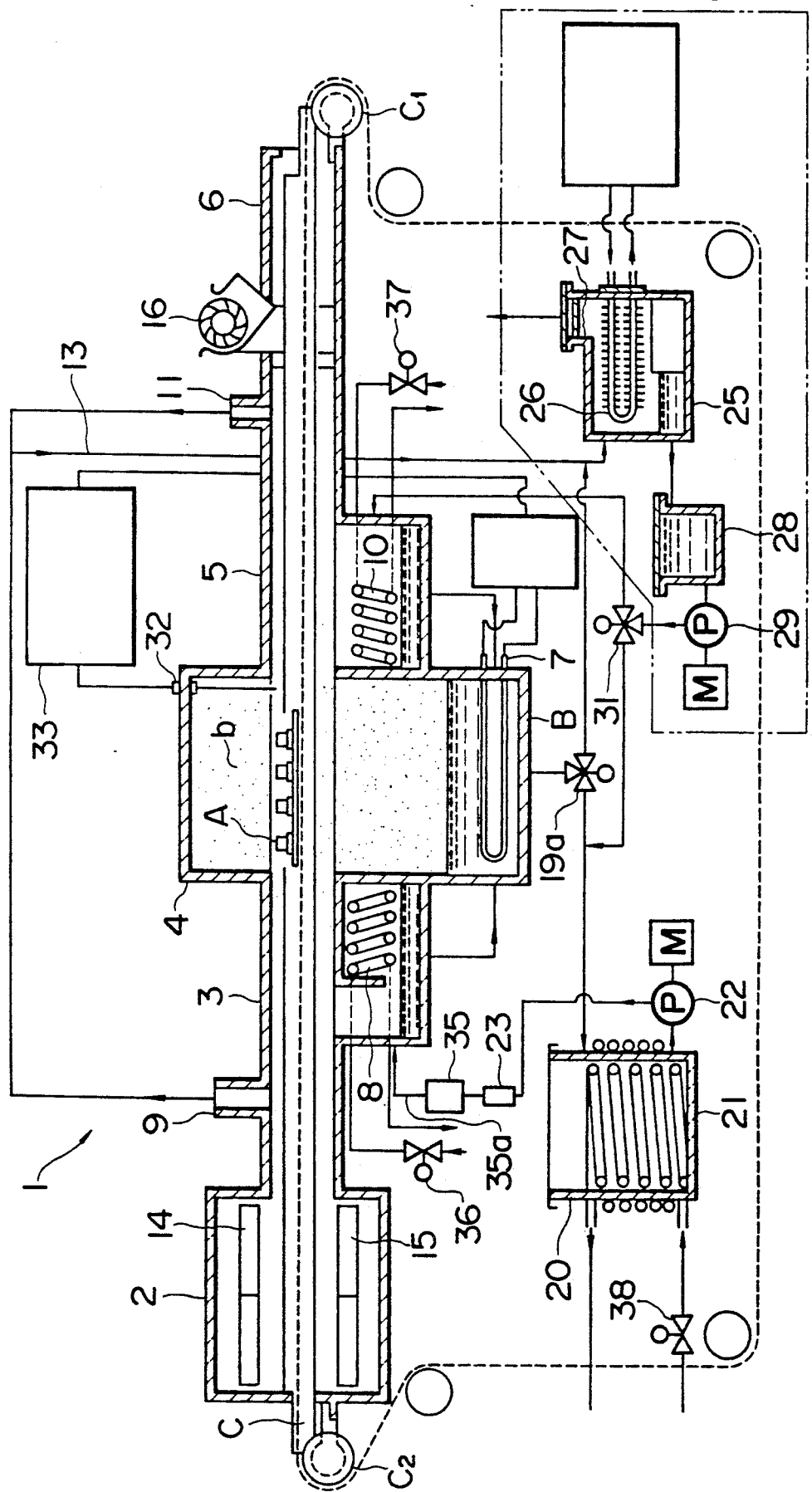

Next, a fourth embodiment will be described with reference to FIG. 4. Upon the completion of a day's operation, feed valves 36 and 37 are closed to stop water from being supplied to the cooling coils 8 and 10 immediately after the thermomedium B is transferred to the filtering tank 20, thereby preventing the temperature in the reflow section 1 from being lowered and preventing also the temperature of the air entered into the reflow section from being lowered. As a result, condensation of water and steam contained in the air can be reduced. It is therefore possible to save the energy for heating the interior of the reflow section 1 at the time of resuming the operation on the next day.

Furthermore, it is of course possible to save the energy by closing a feed valve 38 to stop water from being supplied to the cooling coil 21 in the filtering tank 20. During the operation, the cooled thermomedium is returned to the reflow section 1 through the filter 23 by the action of the pump 22. In this case, however, it is further preferred to dispose a water separator 35 in the return pipeline 35a.

WHAT IS CLAIMED IS:

1. A vapor reflow type soldering method adopted in carrying out soldering with use of a vapor reflow type soldering apparatus which comprises a reflow section serving to melt a solder by heating a treated matter using vapor of a thermomedium, a filtering section serving to remove foreign matters mixed in the thermomedium and a recovery section equipped with a water separator for separating and removing water mixed in the thermomedium, the filtering section being equipped with a filtering tank a capacity of which is set to be able to accommodate a whole quantity of thermomedium to be used in the reflow section, said method comprising the steps of:

transferring a bottom part of the thermomedium in a vapor tank directly to said filtering tank upon completion of soldering operation;

transferring a remaining part of the thermomedium to said recovery section to make said remaining part of the thermomedium pass through said water separator; and then transferring said remaining part of the thermomedium to said filtering tank, thereby preventing water in air from remaining mixed in the thermomedium.

2. The method according to claim 1, wherein the thermomedium transferred to the filtering tank is maintained at a temperature at which water is not allowed to remain in the thermomedium, said temperature being not higher than a boiling point of the thermomedium, during a period in which operation of the vapor reflow type soldering apparatus is suspended, hereby preventing water in the air from being mixed in the thermomedium.

3. The method according to claim 2, wherein the thermomedium transferred to the filtering tank and kept warm during the period in which operation of the apparatus is suspended is subsequently transferred, at time of resuming operation, to the reflow section through the water separator.

4. The method according to claim 1, wherein, immediately after part of the thermomedium in the vapor tank is transferred directly to the filtering tank and the remaining part of the thermomedium in the vapor tank is transferred to the filtering tank through the recovery section, thermomedium vapor in the reflow section is stopped from being cooled to be kept warm to prevent a temperature drop of the air mixed in the thermomedium, thereby preventing or reducing condensation of steam in the air.

5. The method according to claim 1, wherein said bottom part of the thermomedium in the vapor tank to be transferred to said filtering tank is not less than 50% of the thermomedium in the vapor tank but is less than 95% thereof.

6. A vapor reflow type soldering method adopted in carrying out soldering with use of a vapor reflow type soldering apparatus which comprises a reflow section serving to melt a solder by heating a treated matter using vapor of a thermomedium in an interior of the reflow section, a filtering section serving to remove foreign matters mixed in the thermomedium and a recovery section equipped with a water separator for separating and removing water mixed in the thermomedium, said method comprising the steps of:

before starting operation, keeping warm the interior of said reflow section in which substantially no thermomedium exists for a predetermined period of time at a temperature at which water is not allowed to remain in the thermomedium, said temperature being not higher than a boiling point of the thermomedium, to evaporate water in air which has entered in said reflow section; and then feeding the thermomedium from said filtering section to said reflow section, thereby preventing the water from being mixed in the thermomedium.

7. A vapor reflow type soldering apparatus comprising a reflow section serving to melt a solder by heating a treated matter using vapor of a thermomedium, a filtering section serving to remove foreign matters mixed in said thermomedium, a recovery section equipped with a water separator for separating and removing water mixed in said thermomedium and a pipeline through which the thermomedium in the recovery section is transferred to the filtering section, wherein a switchable valve means is disposed to selectively connect said reflow section in fluid communication through pipeline with either of said filtering section and said recovery section, to enable a fixed quantity of the thermomedium in said reflow section to be transferred directly to the filtering section as well as to enable the thermomedium in said reflow section to be transferred through the recovery section to the filtering section.

8. The apparatus according to claim 7, further comprising a pipeline through which the thermomedium is transferred from the filtering section to the reflow section, wherein another water separator is disposed in this pipeline.

9. The apparatus according to claim 7, wherein the switchable valve means has at least one three-way valve.

10. The apparatus according to claim 7, wherein the switchable valve means consists of at least one gate valve disposed in a pipeline connecting the reflow section and the filtering section, and at least one gate valve disposed in a pipeline connecting the reflow section and the recovery section.

11. The apparatus according to claim 7, further comprising another valve means connected in the pipeline through which the thermomedium in the recovery section is transferred to the filtering section.

12. The apparatus according to claim 11, wherein the another valve means has at least one three-way valve.

* * * * *